US010950098B2

(12) United States Patent
Susaki et al.

(10) Patent No.: US 10,950,098 B2
(45) Date of Patent: Mar. 16, 2021

(54) CASH PROCESSING APPARATUS

(71) Applicant: TOSHIBA TEC KABUSHIKI KAISHA, Tokyo (JP)

(72) Inventors: Akiko Susaki, Tokyo (JP); Norifumi Shishido, Osaka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 972 days.

(21) Appl. No.: 15/599,642

(22) Filed: May 19, 2017

(65) Prior Publication Data

US 2017/0337763 A1  Nov. 23, 2017

(30) Foreign Application Priority Data

May 19, 2016  (JP) .............................. JP2016-100491

(51) Int. Cl.
*G07D 11/00* (2019.01)
*G07F 19/00* (2006.01)
(Continued)

(52) U.S. Cl.
CPC .............. *G07F 19/205* (2013.01); *G07D 1/02* (2013.01); *G07F 7/04* (2013.01); *G07F 19/202* (2013.01);
(Continued)

(58) Field of Classification Search
CPC ...... G07D 11/24; G07F 19/202; G07F 19/205
(Continued)

(56) References Cited

U.S. PATENT DOCUMENTS

| 3,797,307 | A | * | 3/1974 | Johnston | ................... | G07D 5/02 |
| | | | | | | 73/163 |
| 6,165,064 | A | * | 12/2000 | Aurelius | ................... | G07D 1/02 |
| | | | | | | 453/18 |
| 2004/0140441 | A1 | * | 7/2004 | Chen, Jr. | ................... | G07F 7/04 |
| | | | | | | 250/556 |

FOREIGN PATENT DOCUMENTS

| JP | 5-348957 | 12/1994 |
| JP | 2008-130009 | 6/2008 |

(Continued)

OTHER PUBLICATIONS

Machine Translation of JP2008217737, Masaki et all., Dec. 2010.*
(Continued)

*Primary Examiner* — Charles A Fox
*Assistant Examiner* — Michael E Butler
(74) *Attorney, Agent, or Firm* — Amin, Turocy & Watson, LLP (57) ABSTRACT

A cash processing apparatus comprises a housing provided with a depositing and dispensing section; a display section; a coin insertion section at a position at one side of a central part in a width direction of the housing and into which the coin is inserted; a coin placing section in the housing and having a coin placing surface for temporarily placing the coin, connecting to the coin insertion section side by side and extend to an opposite side across the central part in the width direction of the housing from the coin insertion section to form a shape elongated in the width direction; and a settlement module, wherein both a distance between the coin insertion section and one side end of the housing which is closest to the coin insertion section and a distance between the coin placing section and the other side end of the housing which is closest to the coin placing section are smaller than a depth distance of the coin placing section.

20 Claims, 7 Drawing Sheets

(51) Int. Cl.
- *G07G 1/00* (2006.01)
- *G07D 1/02* (2006.01)
- *G07F 7/04* (2006.01)
- G07D 11/24 (2019.01)
- G07D 11/40 (2019.01)
- G07D 11/50 (2019.01)
- G06Q 20/20 (2012.01)
- G07G 1/12 (2006.01)
- G07F 5/24 (2006.01)
- G07D 11/60 (2019.01)
- B07C 5/00 (2006.01)
- G07D 9/00 (2006.01)
- G07D 13/00 (2006.01)
- G07F 9/08 (2006.01)

(52) U.S. Cl.
CPC .............. *G07G 1/0018* (2013.01); *B07C 5/00* (2013.01); *G06Q 20/20* (2013.01); *G07D 9/00* (2013.01); *G07D 11/24* (2019.01); *G07D 11/40* (2019.01); *G07D 11/50* (2019.01); *G07D 11/60* (2019.01); *G07D 13/00* (2013.01); *G07F 5/24* (2013.01); *G07F 9/08* (2013.01); *G07G 1/12* (2013.01)

(58) Field of Classification Search
USPC ......................................................... 209/534
See application file for complete search history.

(56) References Cited

FOREIGN PATENT DOCUMENTS

| | | |
|---|---|---|
| JP | 2008-217737 | 9/2008 |
| JP | 2013-175119 | 9/2013 |
| JP | 2014-052714 | 3/2014 |
| JP | 2014-52722 | 3/2014 |
| JP | 2015-026240 | 2/2015 |
| JP | 2015-156138 | 8/2015 |

OTHER PUBLICATIONS

Japanese Office Action for Japanese Patent Application No. 2018-158823 dated Jul. 30, 2019.

Japanese Office Action for Japanese Patent Application No. 2017-018735 dated May 8, 2018.

* cited by examiner

CASH PROCESSING APPARATUS

CROSS-REFERENCE TO RELATED APPLICATIONS

This application is based upon and claims the benefit of priority from Japanese Patent Application No. 2016-100491, filed May 19, 2016, the entire contents of which are incorporated herein by reference.

FIELD

Embodiments described herein relate generally to a cash processing apparatus.

BACKGROUND

Conventionally, in a POS (Point Of Sales) terminal used in a supermarket and the like, an area is arranged for temporarily holding cash deposited from a customer to confirm the cash before the cash is housed in a drawer. Such an area is called an examination tray or a cash checking tray. By arranging such an area, a store clerk can avoid trouble at the time of receiving and delivering the cash, and can carry out register responsibilities quickly and precisely.

In recent years, in a supermarket and the like, a self-checkout apparatus (self-register) with which a customer can execute a settlement operation by himself or herself independently of the store clerk is used. A coin insertion section capable of receiving a plurality of coins at one time so that the customer can complete an insertion operation of the coins at one time is arranged in the self-register.

Incidentally, among the customers who use the above-mentioned self-register, there exists a customer who inserts requested coins into the coin insertion section after the coins in a purse are temporarily aligned for confirmation in a flat area on the self-register at the time of the settlement.

In such a usage, it is necessary for the customer to pick up the requested coins in hand to insert the coins into the coin insertion section after the coins are aligned for confirmation in the flat area on the self-register. Thus, a flat area as wide as possible is essential while miniaturizing the device.

DETAILED DESCRIPTION

In accordance with an embodiment, a cash processing apparatus used in a settlement processing by a customer comprises a housing provided with a depositing and dispensing section configured to store a coin and dispense the stored coin; a display section configured to display total payment to a customer; a coin insertion section arranged at a position at one side of a central part in a width direction of the housing and into which the coin is inserted; a coin placing section, which is arranged in the housing and have a coin placing surface for temporarily placing the coin, configured to connect to the coin insertion section side by side and extend to an opposite side across the central part in the width direction of the housing from the coin insertion section to be a shape elongated in the width direction; and a settlement module configured to receive the coin inserted into the coin insertion section to execute a processing, wherein both a distance between the coin insertion section and one side end of the housing which is closest to the coin insertion section and a distance between the coin placing section and the other side end of the housing which is closest to the coin placing section are smaller than a length of a depth of the coin placing section.

Hereinafter, an embodiment of a cash processing apparatus is described in detail with reference to the accompanying drawings. In the present embodiment, an example of applying a self-checkout apparatus for executing commodity registration and settlement by a customer as a cash processing apparatus is described. In the present embodiment, an example of applying a coin change machine as a coin housing section is described. Furthermore, a deposit processing refers to a processing of depositing a coin in a coin change machine accompanied with the settlement processing. The deposit processing refers to a processing of depositing the coin such as a change reserve fund in the coin change machine. Cash is used as a collective term of the coin and a bill, or in a case of unspecifically indicating either the coin or the bill. In other words, the cash processing apparatus is used to handle the coin and/or the bill.

Figure 1:
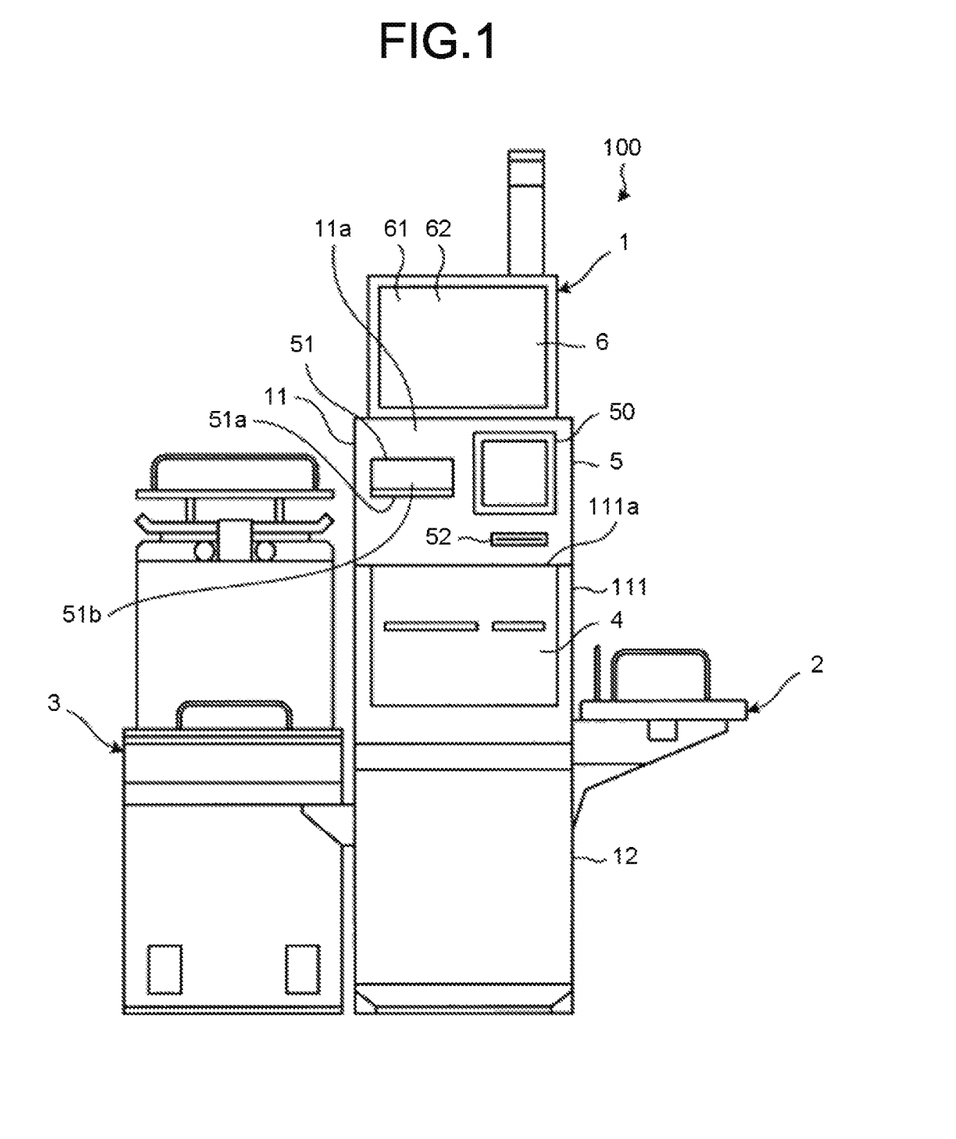
FIG. 1 is a front view illustrating the appearance of a self-checkout apparatus according to an embodiment.

FIG. 1 is a front view illustrating the appearance of the self-checkout apparatus 100 according to the embodiment. As shown in FIG. 1, the self-checkout apparatus 100 includes a settlement terminal 1, a basket placing shelf 2 and a bag packing shelf 3. The settlement terminal 1 includes a depositing and dispensing section 4, a reading section 5, a display operation section 6 and a controller 7 (refer to FIG. 6) for controlling each section.

The settlement terminal 1 includes a first housing 11 and a second housing 12. The first housing 11 includes a door 111 that is openable and closable. The door 111 rotates in a vertical direction around a hinge section 111a. The first housing 11 houses a bill change machine 41 and a coin change machine 42 constituting a depositing and dispensing section 4 (refer to FIG. 2 for all) at the inner side thereof. The second housing 12 houses the controller 7 at the inner side thereof.

The reading section 5 includes a scanner 50 for reading an appearance of a commodity and a symbol (barcode or the like) attached to the commodity to specify the commodity. The reading section 5 includes a printer 51 for printing a receipt relating to a commodity sales data processing executed by the controller 7. The printer 51 issues the discharged receipt from a receipt issuing port 51b. The issued receipt is supported by a receipt discharge table 51a from the lower side thereof. The receipt discharge table 51a is a convex shape protrusion protruding from a front surface 11a vertically arranged on the first housing 11 towards a front side in the depth direction. Furthermore, the reading section 5 includes a card reader 52 for reading a credit card relating to a settlement processing executed by the controller 7. The settlement processing refers to a processing relating to the payment of commodities purchased by a customer.

The display operation section 6 includes a monitor 61 and a touch panel 62. The monitor 61 displays an image under the control of the controller 7. The touch panel 62 is provided on a surface of the monitor 61, and outputs information based on a position touched by an operator to the controller 7.

The basket placing shelf 2 is an object placing table that is used as a storage place for a basket at the time of taking out the commodity in the basket to hold it over the reading section 5. The basket placing shelf 2 is located at one side of the settlement terminal 1.

The bag packing shelf 3 is a table for packing the commodity after scanning. The bag packing shelf 3 is arranged at the other side (opposite to the basket placing shelf 2) of the settlement terminal 1.

Figure 2:
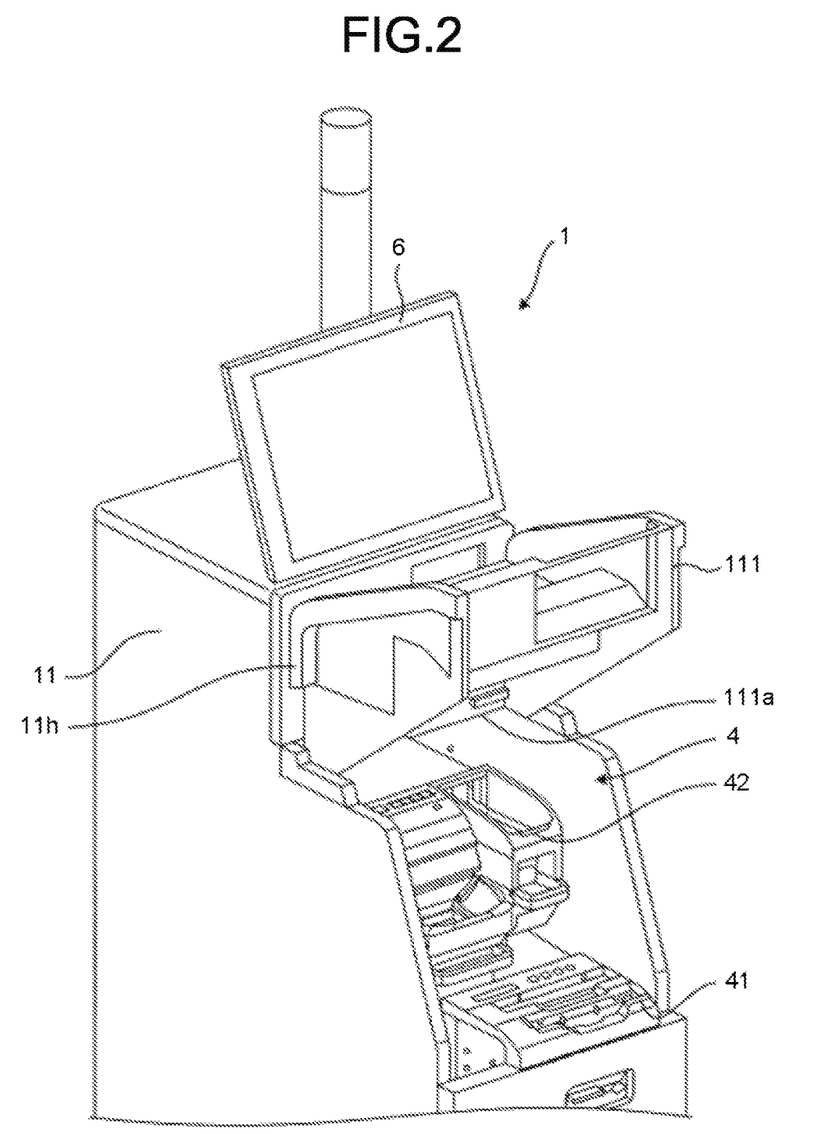
FIG. 2 is a perspective view illustrating the appearance of a settlement terminal with a door thereof opened.
Figure 3:
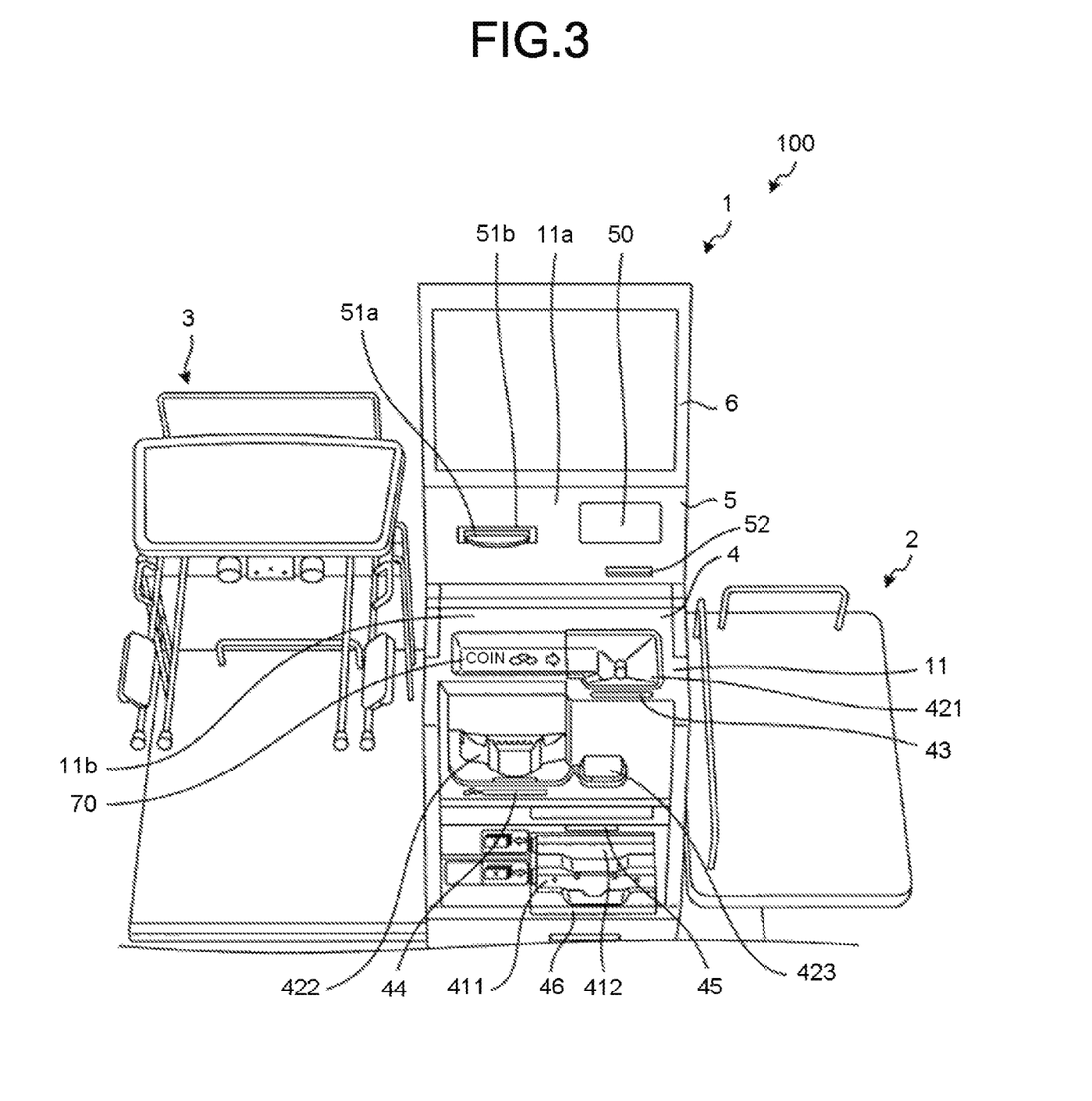
FIG. 3 is a perspective view illustrating the appearance of the self-checkout apparatus if viewed from the above.

Herein, FIG. 2 is a perspective view illustrating the appearance of the settlement terminal 1 with the door 111 thereof opened. As shown in FIG. 3, the first housing 11 opens the inside of the first housing 11 by rotating the door 111 upwards to expose the bill change machine 41 and the coin change machine 42. The bill change machine 41 and the coin change machine 42 are housed in the first housing 11 in a stacked manner and the bill change machine 41 is positioned below the coin change machine 42.

The bill change machine 41 determines correctness of the acquired bill to store specie and dispenses the bill as the change. The coin change machine 42 determines correctness of the acquired coin to store the coin and dispenses the coin as the change. The bill change machine 41 and the coin change machine 42 inform the controller 7 of the amount of the housed money. The bill change machine 41 and the coin change machine 42 receive the information of the amount required to be dispensed as the change from the controller 7.

The controller 7 collectively controls each section (the depositing and dispensing section 4, the reading section 5 and the display operation section 6) of the settlement terminal 1. The controller 7 acquires code information from the reading section 5. The controller 7 outputs information displayed on a monitor 61 of the display operation section 6 and acquires the information of an operation executed by an operator from the touch panel 62. Furthermore, the controller 7 grasps the depositing to the depositing and dispensing section 4 to issue an instruction of the dispensing to the depositing and dispensing section 4.

Herein, FIG. 3 is a perspective view illustrating the appearance of the self-checkout apparatus 100 if viewed from the above. As shown in FIG. 3, the first housing 11 is provided with a coin placing section 70 for placing the coin and a coin insertion section 421 which is a cash insertion port for depositing the cash in the coin change machine 42 at one end side of an upward flat surface section 11b. The coin insertion section 421 receives the inserted coin. The coin received by the coin insertion section 421 is housed in the coin change machine 42 which is the coin storage section.

The first housing 11 (depositing and dispensing section 4) is provided with a dish-shaped coin discharge section 422 and a rejection dish 423, a bill insertion section 411 and a bill discharge section 412 which is a discharge section stepwise in order from a rear side at which the coin insertion section 421 is arranged to a front side. In other words, a surface on which the coin insertion section 421 is arranged is an upper stage, a surface on which the coin discharge section 422 and the rejection dish 423 are provided is a middle stage, and a surface on which the bill insertion section 411 and the bill discharge section 412 are provided is a lower stage. By arranging various insertion ports and discharge ports stepwise in this manner, it is possible to overlook all the insertion ports and discharge ports from the rear side to the front side.

The coin discharge section 422 is a dish for receiving the coin discharged from the coin change machine 42. The rejection dish 423 is a dish for receiving the coin (rejected coin) that should not be stored in the coin change machine 42 such as a deformed coin, foreign money, counterfeit money and the like.

As shown in FIG. 3, the coin discharge section 422 is arranged at an end opposite to an end where the coin insertion section 421 is arranged in a width direction of the settlement terminal 1. In this way, the coin insertion section 421 and the coin discharge section 422 are arranged to be deviated respectively in a height direction, the width direction and a depth direction, and good visibility and operability for the coin discharge section 422 can be obtained. Furthermore, the rejection dish 423 and the coin discharge section 422 are arranged side by side at a lower position of the coin insertion section 421.

The bill insertion section 411 is an insertion port for receiving the bill deposited in the bill change machine 41. The customer inserts the bill into the coin insertion section 411 in such a manner that the bill drops from the above. The bill insertion section 411 receives the inserted bill. The bill received by the bill insertion section 411 is stored in the bill change machine 41. The bill discharge section 412 is a discharge port for supporting the bill discharged from the bill change machine 41. The bill which becomes the change is conveyed upwards from the bill change machine 41, and the conveyed bill is supported by the bill discharge section 412 to be stopped on the bill discharge section 412. In this way, the bill is dispensed from the bill change machine 41. The customer receives the dispensed bill.

In addition, LEDs 43~46 for notifying an operation procedure and an error are arranged respectively nearby the coin insertion section 421, the coin discharge section 422, the rejection dish 423, the bill insertion section 411 and the bill discharge section 412. Furthermore, the positions where the LEDs 43~46 are arranged are not limited to the vicinities of those sections. The number of the LEDs 43~46 and the arrangement thereof are also not specifically limited.

Figure 4:
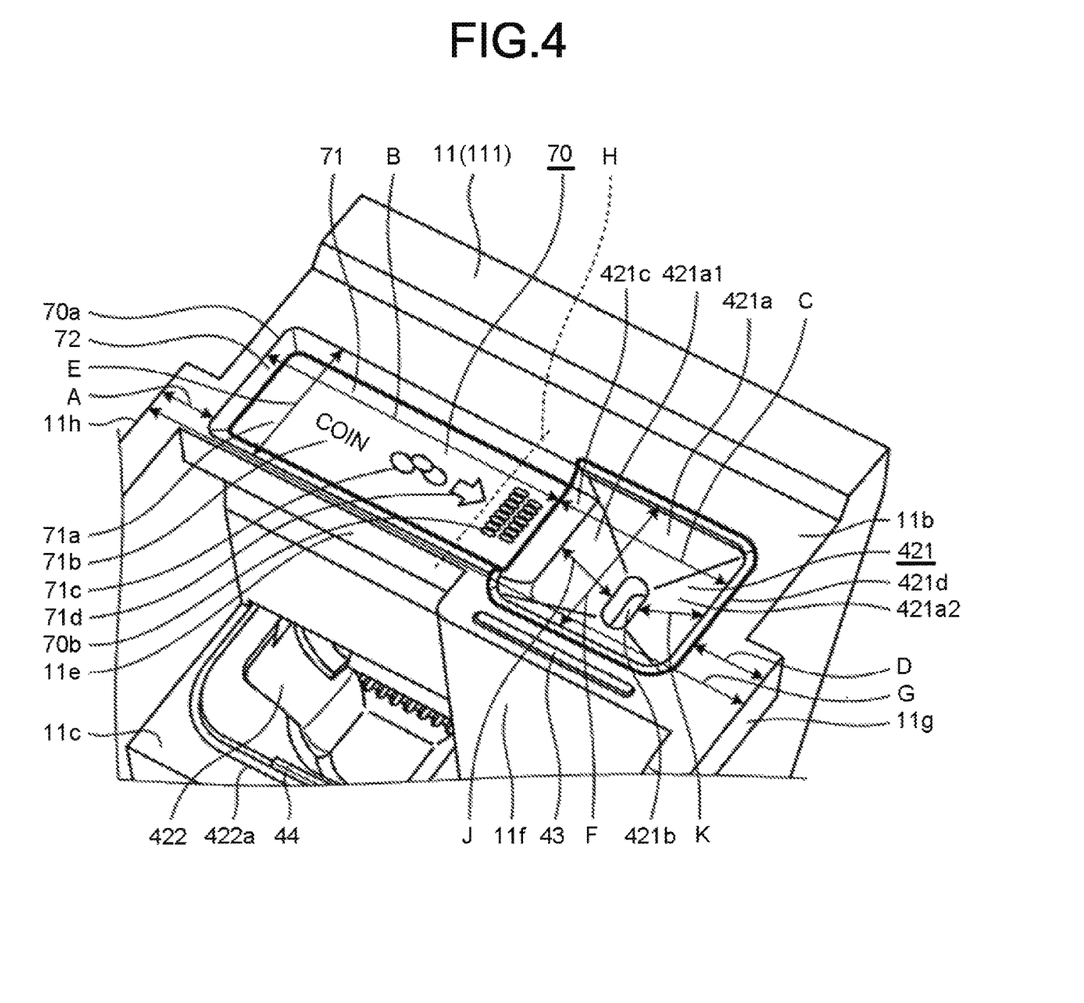
FIG. 4 is a perspective view illustrating the appearance of the vicinity of a coin insertion section.

Next, the constitutions of the coin insertion section 421 and the coin placing section 70 and the constitutions in the vicinities thereof are described. Herein, FIG. 4 is a plan view illustrating the appearance of the vicinity of the coin insertion section 421. As shown in FIG. 4, the coin insertion section 421 has a funnel-shaped inclined surface 421a that descends from the outside toward the inside and a hole 421b provided at the lowermost portion of the inclined surface 421a. The hole 421b is the hole for enabling the coin sliding down from the inclined surface 421a to fall into the coin change machine 422. The hole 421b is a vertically long hole if viewed by the customer standing in front of the settlement terminal 1. A dimension in the longitudinal direction of the hole 421b is larger than a diameter of a 500-yen coin which is the largest coin, and a dimension in the width direction orthogonal to the longitudinal direction of the hole 421b is set such that a plurality of coins can pass through the hole in an overlapped manner. With such a constitution, the coin insertion section 421 can collectively receive the plurality of coins.

The hole 421b has a shape in which a length in a direction orthogonal to a direction in which the coin slides towards the coin insertion section is longer than a length in a direction in which the coin slides towards the coin insertion section 421. Ideally, the hole 421b is a long hole with a longitudinal direction thereof formed in a direction orthogonal to the direction in which the coin slides towards the coin insertion section 421; however, the longitudinal direction of the hole 421b is not necessarily the direction orthogonal to the direction in which the coin slides towards the coin insertion section 421.

In addition, the door 111 of the first housing 11 includes a coin placing section 70 arranged at a position connected to the coin insertion section 421 side by side in the width direction of the settlement terminal 1 in the flat surface section 11b. The coin placing section 70 is generally called an examination tray or a cash checking tray. The coin placing section 70 is used for visually confirming the cash which is taken out by the customer from a purse to be used for payment at the time of the settlement processing by the settlement terminal 1. The coin placing section 70 is positioned at a central part of the first housing 11. The coin insertion section 421 is positioned at one side in the width direction of the first housing 11 with respect to the central part of the first housing 11. The coin placing section 70 is arranged to extend at a side opposite to the coin insertion section 421 with respect to the central part of the first housing 11.

More specifically, the coin placing section 70 is a concave shape that is recessed slightly downwards from the flat surface section 11b, and a coin placing surface 71 of a planar shape for placing the coin is arranged at the bottom part of the coin placing section 70. The coin placing surface 71 is flat surface for temporarily placing the coin. The coin placing section 70 includes a guidance wall 72 for forming three peripheral parts of the coin placing surface 71. The guidance wall 72 descends downwards from the flat surface section 11b towards the coin placing surface 71. Furthermore, the coin placing surface 71 is not limited to the planar shape, and may be curved into a concave shape. An edge for surrounding the three peripheral parts of the coin placing surface 71 protruding upwards is arranged in the flat surface section 11b, and may be used as the coin placing section 70 of the concave shape recessed downwards from an upper end of the edge. In this case, the coin placing surface 71 may be positioned above the flat surface section 11b, in the same plane as the flat surface section 11b, or below the flat surface section 11b. In this case, the edge may continuously surround the periphery of the coin placing section 70. The edge may intermittently surround the periphery of the coin placing section 70 in such an extent that the coin cannot spill from the coin placing section 70. Furthermore, the coin placing surface 71 is formed at a substantially identical size to the coin placing section 70.

Incidentally, there is a case in which the customer wants a mark indicating which position in the coin placing section 70 the coin in the purse is required to be placed. Thus, in the embodiment, a sheet 71a made of plastics and metal is pasted on the coin placing surface 71. The surface of the sheet 71a is subjected to low friction coating such as fluorine process. Therefore, the coin placed on the sheet 71a is easy to slide on the sheet 71a.

The sheet 71a is pasted to prevent the coin placing section 70 from being soiled or scratched by the placed cash. On the surface of the sheet 71a, an explanation display of a usage mode of the coin placing section 70 is provided. In an embodiment, as an example of a guide showing that the coin placing section 70 is an area for placing the coin, a character 71b of "coin", a drawing 71c of the coin and a drawing of an arrow 71d are displayed on the surface of the sheet 71a.

In other words, the character 71b of "coin" and the drawing 71c of the coin indicate that the coin placing section 70 is an area where the coin is placed. In addition, the drawing of the arrow 71d shows the customer an operation of sliding the coin on the sheet 71a in a direction of the arrow which is the insertion direction of the cash. In a case in which the sheet 71a is pasted on the coin placing surface 71, the surface of the sheet 71a is the coin placing surface 71.

Furthermore, the guide may be directly displayed on the coin placing surface 71 such as being printed on the coin placing surface 71 of the coin placing section 70. The guide may be displayed on the coin placing surface 71 so as to project from above onto the coin placing surface 71. The coin placing surface 71 has a color that is largely different from the color of the coin placed on the coin placing surface 71, or has a color (for example, gray) with which the coin placed on the coin placing surface 71 can be clearly recognized. Specifically, the coin placing surface 71 is formed in a color different from silver color of 1-yen coin, 50-yen coin, 100-yen coin and 500-yen coin, and a copper color of 5-yen coin and 10-yen coin. Therefore, the customer distinguishes the coin placed on the coin placing surface 71 from the coin placing surface 71 to recognize it. Therefore, the customer can visually confirm the presence or absence of the coin left behind on the coin placing surface 71 easily.

It is not necessary to print all the character 71b, the drawing 71c and the arrow 71d, and, for example, in order to show the position where the coin on the coin placing section 70 is placed, either or both of the character 71b and the drawing 71c may be printed. Instead of pasting the sheet 71a on the coin placing surface 71, the character 71b, the drawing 71c of the coin and the arrow 71d may be directly printed (form a guide section) on the coin placing surface 71.

The coin insertion section 421 includes four inclined surfaces 421a. The first inclined surface 421a is an inclined surface 421a1 connected to the coin placing surface 71 described later. The inclined surface 421a1 is inclined downwards in a direction in which the coin slides. The second inclined surface 421a is an inclined surface 421a2 provided at the side opposite to the inclined surface 421a1. The inclined surface 421a2 is inclined downwards from the side opposite to the inclined surface 421a1 (in other words, inclined downwards to the opposite side to the direction in which the coin slides). The third inclined surface and the fourth inclined surface are connected to the first inclined surface 421a1 and the second inclined surface 421a2 and inclined downwards in a direction orthogonal to the direction in which the coin slides. The third inclined surface and the fourth inclined surface 421a are provided at positions facing each other.

By the first inclined surface 421a1, the second inclined surface 421a2, the third inclined surface and the fourth inclined surface 421a, the coin insertion section 421 is formed into a square shape. The first inclined surface 421a1, the second inclined surface 421a2, the third inclined surface and the fourth inclined surface 421a respectively form the inclined surfaces descending towards the central part of the coin insertion section 421. In other words, the coin insertion section 421 includes four inclined surfaces inclined downwards towards the central part of the coin insertion section 421. The coin insertion section 421 includes a hole 421b at the central part. The hole 421b communicates with individual inclined surfaces.

A length K of the second inclined surface 421a2 in the inclined direction is longer than a length J of the first inclined surface 421a1 in the inclined direction. In other words, the length J of the first inclined surface 421a1 in the inclined direction is shorter than the length K of the second inclined surface 421a2 in the inclined direction. In other words, the second inclined surface 421a2 is formed until a position higher than the first inclined surface 421a1. Thus, even if the coin sliding from the coin placing surface 71 to be conveyed to the coin insertion section 421 and sliding vigorously down from the first inclined surface 421a1 jumps over the hole 421b and is conveyed to the second inclined surface 421a2 side, there is no possibility that the coin passes over the second inclined surface 421a2 and jumps out to the outside, and the coin slides down from the second inclined surface 421a2 towards the hole 421b.

The coin sliding on the coin placing surface 71 is received by the inclined surface 421a provided in the coin insertion section 421. Then, the coin that slides down from the inclined surface 421a falls into the hole 421b to be stored in the coin change machine 422.

The coin insertion section 421 is formed in a color largely different from the colors of the coin placing section 70 and the first housing 11, in a color with which the coin insertion section 421 is emphasized, or in a color (for example, orange color) with which the coin insertion section 421 can be clearly recognized. Therefore, the customer can visually confirm the position of the coin insertion section 421 easily.

The coin placing section 70 includes a plurality of dirt removal holes 70b at the upstream side of the connection section 421c of the coin placing face 71 in a sliding direction of the coin. The dirt removal hole 70b removes dirt and the like adhering to the coin. The dirt removal hole 70b is formed by arranging long holes in a zigzag shape in the sliding direction (i.e., the arrow 71d direction) of the coin. Therefore, the coin that slides in the arrow 71d direction is hard to get caught in the long hole. The sheet 71a is pasted at a position in front of the dirt removal hole 70b and is not pasted on a position to hide the dust removal hole 70b.

It is desired that the depositing is executed in such a manner that the coin sliding on the sheet 71a to be inserted into the coin insertion section 421 is not caught in the hole 421b and jam does not occur. Thus, in the embodiment, the hole 421b is formed in such a manner that the longitudinal direction of the hole intersects with the sliding direction of the coin (that is, the direction of the arrow) (in the embodiment, the longitudinal direction is orthogonal to the sliding direction of the coin). By forming the hole 421b in such a direction, since the dimension of the hole 421b in the longitudinal direction is larger than the diameter of the 500-yen coin which is the maximum coin that slides on the sheet 71a to be carried by fingers to the coin insertion section 421, passes through the connection section 421c and slides down from the inclined surface 421a towards the hole 421b, the coin is not jammed in the vicinity of the hole 421b.

Even if the sliding direction of the coin is not a direction orthogonal to the longitudinal direction of the hole 421b, as long as it is a direction that intersects with the longitudinal direction at a certain angle, the coin can be deposited without being jammed in the vicinity of the hole 421b.

The guidance wall 72 is provided at the edge except a side connected to the coin insertion section 421 of the coin placing surface 71. The guidance wall 72 protrudes upwards from the coin placing surface 71 to support a side of the cash (particularly, the coin) placed on the coin placing surface 71. Incidentally, such a guidance wall 72 is formed as a part of the first housing 11.

On the other hand, the coin insertion section 421 has a connection section 421c of a planar shape extending from the inclined surface 421a at a position connected to the coin placing surface 71. In other words, the coin insertion section 421 and the coin placing surface 71 are connected. It is needless to say that the connection section 421c is molded according to the shape in a case in which the coin placing surface 71 is curved into a concave shape. Herein, that the coin insertion section 421 and the coin placing surface 71 are connected refers to that the coin insertion section 421 and the coin placing surface 71 are connected via a substantially flat surface, for example. In the case where the coin insertion section 421 and the coin placing surface 71 are connected by a surface that is slightly uneven, it is considered that the coin insertion section 421 and the coin placing surface 71 are connected. Since the coin slidably moves from the coin placing surface 71 to the coin insertion section 421, it is considered that the coin insertion section 421 and the coin placing surface 71 are also connected.

The coin placing section 70 formed in a concave shape in the door 111 of the first housing 11 is arranged at a position that does not interfere with the receipt discharge table 51a of the printer 51 in a state in which the door 111 is rotated upwards and the inside of the first housing 11 is opened. The depth of the concave part of the coin placing section 70 is set to a depth (that is, a depth larger than the length of the receipt discharge table 51a) that can avoid collision with the receipt discharge table 51a.

Next, in order to prevent that the customer forgets to take away the coin which is the change discharged to the coin discharge section 422, it is desired that the coin discharge section 422 is easy to see for the customer. In order to confirm that the customer forgets the coin which is the change, it is desired that an image obtained by photographing the vicinity of the coin discharge section 422 with a camera (not shown) from above is set as an image used for easily confirming that the user forgets to take away the coin. Therefore, as shown in FIG. 4, in the vicinity of the coin placing section 70 of the first housing 11, a part of the first housing 11 is set back to make the coin discharge section 422 easy to see from the camera (not shown) and the customer. Further, an LED 47 (refer to FIG. 6), which is an irradiation section for emitting light, is provided above the coin discharge section 422 which is located below the coin placing section 70 in the first housing 11. The LED 47 irradiates the coin discharge section 422 by emitting the light at the time the coin which is the change is discharged to the coin discharge section 422.

In other words, in FIG. 4, the first housing 11 includes a front surface 11e in front of the coin placing section 70 along the width direction of the first housing 11. The length of the front surface 11e in the width direction of the first housing 11 is substantially equal to the length of the coin placing section 70 in the width direction of the first housing 11. The first housing 11 has a front surface 11f in front of the coin insertion section 421 along the width direction of the first housing 11. The front surface 11e is positioned at a rear side in the depth direction of the first housing 11 with respect to the front surface 11f. Further, the front surface 11e is located at the rear side in the depth direction of the first housing 11 with respect to an edge 422a of the coin discharge section 422 at the front side in the depth direction of the first housing 11. As a result, the front surface 11e is notched with respect to the front surface 11f, and in this way, the camera positioned above the self-checkout apparatus 100 can photograph the whole or at least a part of the coin discharge section 422 positioned below the coin placing section 70. Therefore, by confirming the image captured by the camera at the time the LED 47 irradiates the coin discharge section 422, it is possible to confirm whether or not the customer forgets to take away the coin which is the change.

The settlement terminal 1 includes a sensor 73 (refer to FIG. 6) which is a detection section for detecting an object (such as a purse or a coin) placed on the coin placing surface 71 or around the coin placing surface 71. As the sensor 73, an optical sensor, a magnetic sensor, an image sensor and the like are exemplified. For example, the optical sensor is arranged in such a manner that the optical axis of the optical sensor faces the coin placing surface 71, and if the optical axis is obstructed, it is determined that there is an object on the coin placing surface 71. The magnetic sensor is arranged, for example, at a position corresponding to the rear side of the coin placing surface 71, and if the metal is detected, it is determined that there is an object on the coin placing surface 71. The image sensor is arranged, for example, above the coin placing surface 71 and determines that there is an object on the coin placing surface 71 by image recognition.

In FIG. 4, A-G indicate the length of each section of the first housing 11. A indicates a distance between an end 70a at a side opposite to the connection section 421c between the coin insertion section 421 and the coin placing section 70 in the width direction of the first housing 11 and a left side end 11h of the first housing 11. B indicates the length in the width direction of the first housing 11 of the coin placing section 70. C indicates the length of the coin insertion section 421 in the width direction of the first housing 11. D indicates a distance between an end 421d at a side opposite to the connection section 421c between the coin insertion section 421 and the coin placing section 70 in the width direction of the housing 11 and a right side end 11g (the other side end) of the first housing 11. E indicates the length of the coin placing section 70 in the depth direction of the first housing 11. F indicates the length of the coin insertion section 421 in the depth direction of the first housing 11. G indicates the length in the width direction of the first housing 11. H indicates the central part in the width direction of the first housing 11. A is the length between the coin placing section 70 and the side end closest to the coin placing section 70 of the first housing 11. D is the length between the closest side end of the first housing 11 and the cash insertion port 421. Further, the length F of the coin insertion section 421 in the depth direction of the first housing 11 is longer than the length E of the coin placing section 70 in the depth direction of the first housing 11.

Herein, the coin placing section 70 that can easily execute an operation of inserting the coins after aligned into the coin insertion section with respect to the coin change machine so that the customer who uses the self-register inserts the coins into the coin insertion section 421 after confirming the coins. Thus, in the embodiment, the length (B+C) combining the length (B) of the coin placing section 70 in the width direction of the first housing 11 and the length (C) of the coin insertion section 421 in the width direction of the first housing 11 is set to 70% or more of the length (G) in the width direction of the first housing 11. Both the distance (A) between the end 70a at the side opposite to the connection section 421c between the coin insertion section 421 and the coin placing section 70 in a width direction of the first housing 11 and the left side end 11h of the first housing 11 and the distance (D) between the end 421d at a side opposite to the connection section 421c between the coin insertion section 421 and the coin placing section 70 in the width direction of the housing 11 and the right side end 11g of the first housing 11 are smaller than the length (E) in the depth direction of the coin placing section 70.

The coin insertion section 421 is arranged at the right side (one side) in the width direction of the first housing 11 with respect to the central part H. The coin insertion section 421 is connected to the coin placing surface 71 in the width direction of the first housing 11 at a position on the right side of the central part H. In other words, the coin insertion section 421 is connected to the coin placing section 70 in the width direction of the first housing 11 at the position on the right side of the central part H. The coin placing section 70 is formed by extending to a side opposite to the coin insertion section 421 with respect to the central part H from the connected position. In other words, the coin placing section 70 is formed at both sides across the central part H in the width direction of the first housing 11 or is arranged with a size across the central part H. The cash insertion port 421 is positioned at one side from the central part H in the width direction of the first direction 11, and the coin placing section 70 is positioned at a position including the central part H in the width direction of the first housing 11 and is provided by extending from the cash insertion port 421 to the opposite side to the central part H of the first housing 11.

In this way, in the embodiment, as it is possible to provide the coin placing section 70 larger than the first housing 11 in both the width direction and the depth direction, the coin placing section 70 enables the coins to be inserted into the connected coin insertion section 421 after the aligned coins are confirmed. Specifically, in the settlement processing of the settlement terminal 1, the customer can take out the cash (coins) used for payment from the purse and confirm the cash by aligning them on the coin placing surface 71 of the coin placing section 70. The customer can slide the aligned coins on the coin placing surface 71 towards the coin insertion section 421 in a direction of the arrow 71d to insert them into the coin insertion section 421 to perform the payment. In the embodiment, in this way, as the coin placing section 70 is larger than the first housing 11 in both the width direction and the depth direction to some extent, it is easy for the customer to perform the operation of inserting the coins after aligned into the coin insertion section 421 with respect to the coin change machine. At this time, the guidance wall 72 of the coin placing section 70 prevents the coin from falling down from the coin placing surface 71 by supporting the side part of the coin.

Figure 5:
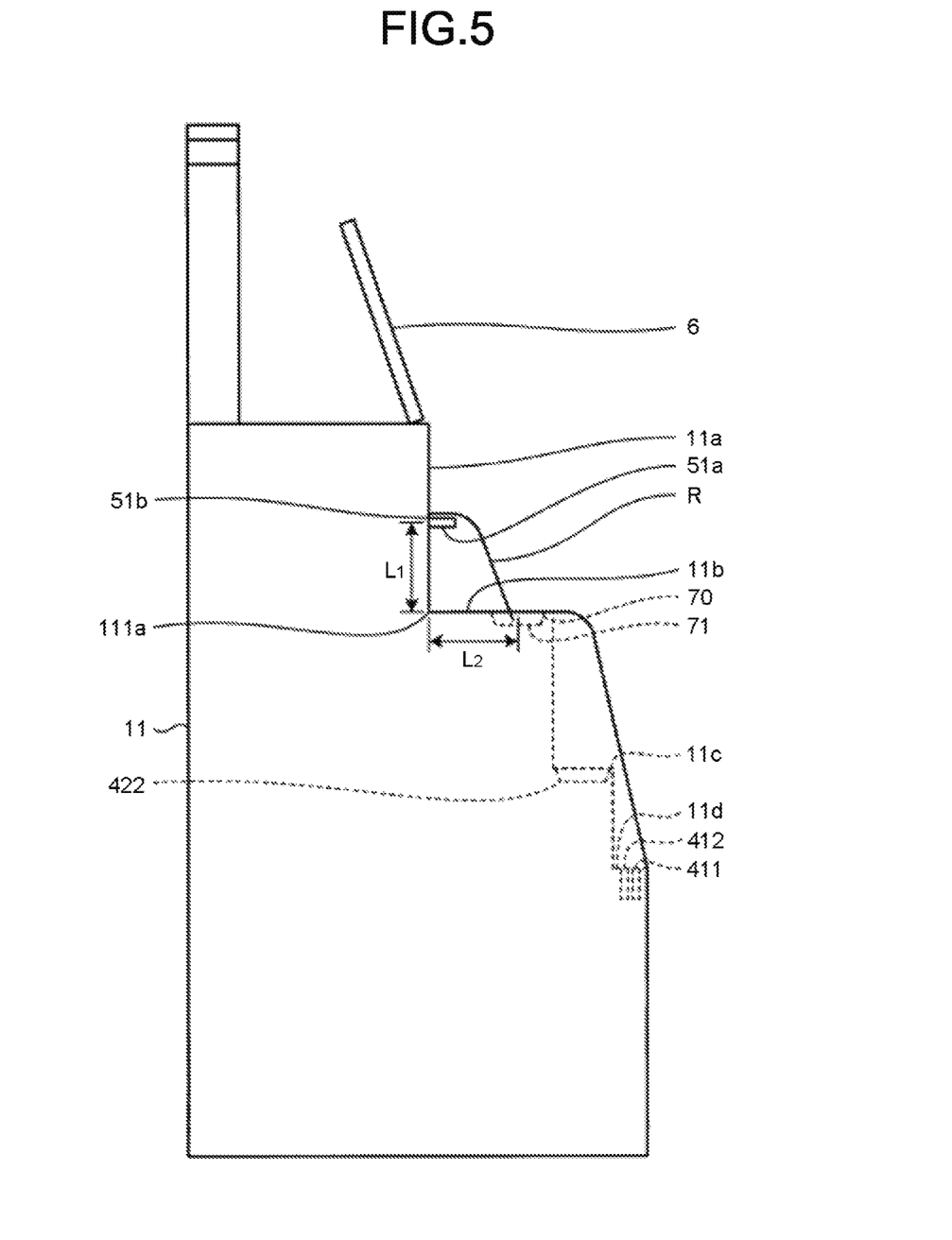
FIG. 5 is a schematic diagram illustrating the settlement terminal if viewed from a left side.

The arrangement relationship of the top and the bottom and the arrangement relationship of the front and back among the receipt issuing port 51b, the coin placing section 70, the coin discharge section 422, the bill insertion section 411 and the bill discharge section 412 are described. Since the settlement terminal 1 is operated by the customer, in order to improve operability thereof, it is necessary for the customer to overlook all of the receipt issuing port 51b, the coin placing section 70, the coin discharge section 422, the bill insertion section 411 and the bill discharge section 412. Therefore, in the embodiment, the arrangement relationship of the top and the bottom and the arrangement relationship of the front and back are as follows. FIG. 5 is a schematic view illustrating the first housing 11 if viewed from the left side in FIG. 3. In FIG. 5, a dotted line is a virtual line showing the constitution of a part that is hidden by the housing and is not actually visible.

The front surface 11a of a planar shape on the top of the first housing 11 is provided with a receipt issuing port 51b for issuing a receipt Ron which contents based on the settlement processing (commodity information, settlement information, etc.) are printed. The receipt R is issued to the right direction in FIG. 5. The receipt discharge table 51a is a convex protrusion protruding to the front side (right side in FIG. 5) in the depth direction of the first housing 11. The receipt discharge table 51a supports the receipt R immediately after issuance from the receipt issuing port 51*b* from the lower side to the upper side.

The coin placing section 70 is formed at the front side in the depth direction of the first housing 11 with respect to the receipt issuing port 51*b* on the flat surface section 11*b* below the receipt issuing port 51*b*. A receiving surface for receiving the receipt R issued from the front surface 11*a* located at a high position is desired. Therefore, the settlement apparatus 1 issues the receipt R towards the coin placing surface 71. Therefore, a tip part of the receipt R issued by the receipt issuing port 51*b* and beyond the receipt discharge table 51*a* eventually abuts against the coin placing surface 71 of the coin placing section 70 to receive the receipt R. The coin placing section 70 is the receiving surface of the receipt R. The coin insertion section 421 is also formed in the same flat surface section 11*b* as the coin placing section 70.

The length L1 from the hinge section 111*a* to the receipt issuing port 51*b* and the length L2 from the hinge section 111*a* to the central part in the depth direction of the first housing 11 are substantially the same. Therefore, in a case in which the door 111 is rotated upwards, the receipt discharge table 51*a* and the coin placing section 70 interfere with each other. Then, the receipt discharge table 51*a* fits into the concave part of the coin placing section 70 and does not collide with each other.

The coin discharge section 422 is formed at the front side in the depth direction of the first housing 11 with respect to the coin placing section 70 in the flat surface section 11*c* below the coin placing section 70. The bill insertion section 411 and the bill discharge section 412 are formed side by side at the front side in the depth direction of the first housing 11 with respect to the coin discharge section 422 in the flat surface section 11*d* below the coin discharge section 422. The bill insertion section 411 is formed at the front side in the depth direction of the first housing 11 with respect to the bill discharge section 412.

In this way, from the upper side to the lower side of the first housing 11, the receipt issuing port 51*b*, the coin placing section 70, the coin discharge section 422, the bill insertion section 411 and the bill discharge section 412 are formed into substantially stepwise shape. Thus, the customer can overlook all of the receipt issuing port 51*b*, the coin placing section 70, the coin discharge section 422, the bill insertion section 411 and the bill discharge section 412. As the coin is more frequently dispensed to the customer as the change than the bill, the coin discharge section 422 is positioned above the bill discharge section 412. The bill insertion section 411 at the lowermost part is formed to open upwards. Then, the bill insertion section 411 receives the bill that the customer inserts downward from above. Therefore, the customer can easily execute the deposit operation. The bill discharge section 412 is formed to open upwards. Then, the bill discharge section 412 discharges the bill dispensed from the bill change machine 41 from the lower side to the upper side. Therefore, the customer can easily receive the dispensed bill. The receipt issuing port 51*b*, the coin placing section 70, the coin discharge section 422, the bill insertion section 411 and the bill discharge section 412 are formed gradually downwards in this order and just formed gradually at the front side in the depth direction in this order and may not necessarily be formed in a stepwise shape.

Figure 6:
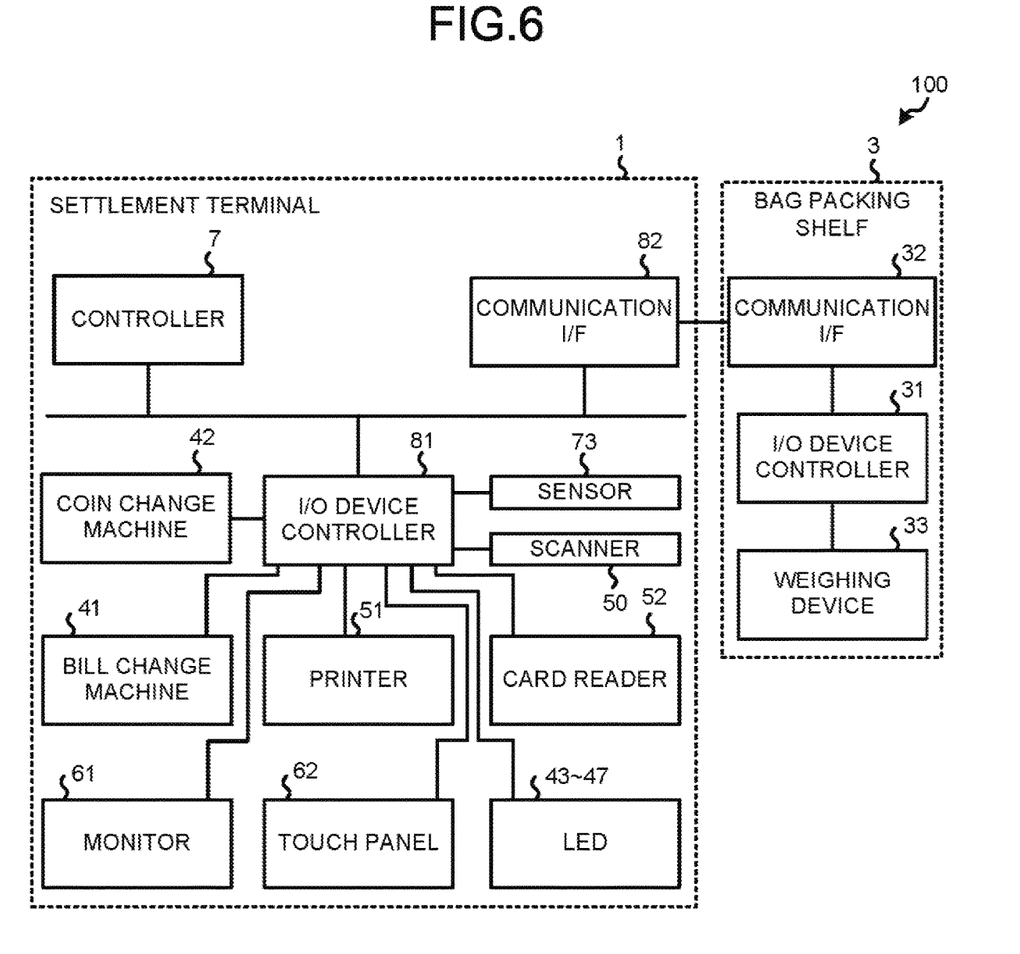
FIG. 6 is a block diagram illustrating the hardware structure of the self-checkout apparatus.

Next, the hardware structure of the self-checkout apparatus 100 is described. FIG. 6 is a block diagram illustrating the hardware structure of the self-checkout apparatus 100.

As shown in FIG. 6, the settlement terminal 1 includes the controller 7, an I/O device controller 81, and the communication I/F 82. The communication I/F (interface) 82 is connected to the bag packing shelf 3 in a communicable manner. The I/O device controller 81 is connected to the controller 7, the bill change machine 41, the coin change machine 42, the LEDs 43-47, the scanner 50, the printer 51, the card reader 52, the monitor 61, the touch panel 62, and the sensor 73.

On the other hand, the bag packing shelf 3 further includes an I/O device controller 31, a communication I/F 32, and a weighing device 33. The weighing device 33 measures the weight of the commodity placed on the bag packing shelf 3. The communication I/F (interface) 32 is connected to the settlement terminal 1 in a communicable manner. In other words, the I/O device controller 31 connects the weighing device 33 to the controller 7 via the communication I/F 32 and the communication I/F 82. The weighing device 33 measures the weight of the commodity on the bag packing shelf 3 for a purpose of preventing unauthorized use.

The controller 7 has a CPU (Central Processing Unit), a ROM (Read Only Memory), and a RAM (Random Access Memory). The ROM stores various computer programs executed by the CPU and various data. The RAM temporarily stores data and the computer program at the time the CPU executes the computer program. The controller 7 copies or decompresses the computer program read out from the ROM by the CPU on the RAM and executes it, thereby collectively controlling each section.

The computer program executed by the self-checkout apparatus 100 of the present embodiment is recorded in a computer-readable recording medium such as a CD-ROM, a FD (Flexible Disk), a CD-R, a DVD (Digital Versatile Disk) and the like in the form of installable or executable file to be provided.

Further, the computer program executed by the self-checkout apparatus 100 of the present embodiment is stored in a computer connected with a network such as the Internet and may be provided by being downloaded via the network. The computer program executed by the self-checkout apparatus 100 of the present embodiment may be supplied or distributed via the network such as the Internet.

The computer program executed by the self-checkout apparatus 100 of the present embodiment may be incorporated into a ROM or the like to be provided.

Next, among various processing executed by the controller 7 of the settlement terminal 1 of the self-checkout apparatus 100, the settlement processing which is the characteristic function of the present embodiment is described. Herein, FIG. 7 is a functional block diagram illustrating the functions relating to the settlement processing, and FIG. 8 is a flowchart illustrating the flow of the settlement processing.

Figure 7:
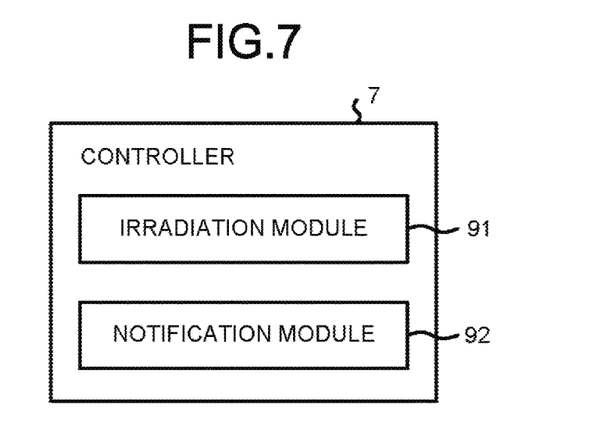
FIG. 7 is a functional block diagram illustrating functional components relating to a settlement processing.
Figure 8:
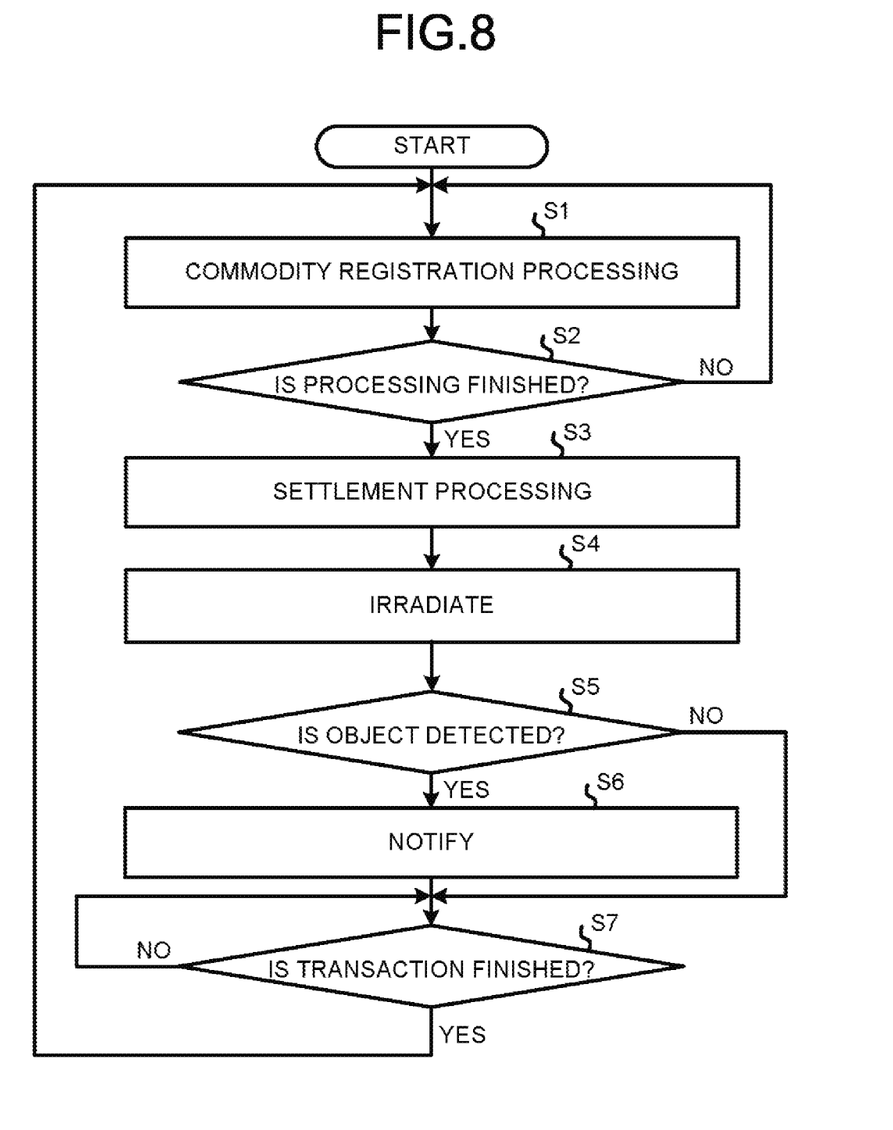
FIG. 8 is a flowchart illustrating the flow of a settlement processing.

In the settlement processing, the controller 7 of the settlement terminal 1 operates according to the computer program to realize an irradiation module 91 and a notification module 92 as the functional sections as shown in FIG. 7.

The irradiation module 91 enables the LED 47 to generate light to emit the light in response to the timing of the dispensing of the coin change machine 42.

If detecting an object (a purse, a coin and the like) placed on the coin placing surface 71 or around the coin placing surface 71 by the sensor 73 at the end of payment, the notification module 92 notifies a message indicating an object is detected.

The settlement processing is described with reference to the flowchart shown in FIG. 8. As shown in FIG. 8, first, the controller 7 of the settlement terminal 1 executes a commodity registration processing (Act S1).

Herein, the commodity registration processing is described. If the customer holds the image in which a commodity code is encoded over the scanner 50, the scanner 50 reads the code and outputs the commodity code. If the scanner 50 outputs the commodity code, the controller 7 refers to a PLU (Price Look Up) file stored in a storage section of the settlement terminal 1 or an external device that is online connected. The PLU file is used to record a name, a price and the like of the commodity in association with the commodity code in the form of a table, for example.

Next, the controller 7 obtains information associated with the commodity code read by the scanner 50 among the information recorded in the PLU file. Then, the information is recorded as commodity information, and a price of the commodity is added to a purchase price. Thus, the commodity registration is carried out.

The controller 7 of the settlement terminal 1 performs the settlement processing (Act S3) if the customer finishes commodity registration and bagging (Yes in Act S2). The controller 7 of the settlement terminal 1 returns to the commodity registration processing (Act S1) if the customer does not finish the processing such as commodity registration processing (No in Act S2).

The settlement processing is described. The controller 7 of the settlement terminal 1 displays the price obtained by totaling the prices of the registered commodities on the monitor 61 if receiving an operation for proceeding to the settlement from the customer. Along with this, the controller 7 of the settlement terminal 1 starts reception of the settlement operation by the customer.

In the cash settlement, the controller 7 calculates a difference (change) between the payment and the deposited cash if the depositing to the bill insertion section 411 of the bill change machine 41 and the coin insertion section 421 of the coin change machine 42 is performed. The controller 7 dispenses a change from the bill discharge section 412 of the bill change machine 41 and the coin discharge section 422 of the coin change machine 42 if there is the change.

The controller 7 (irradiation module 91) of the settlement terminal 1 executes irradiation of the LED 47 in response to the timing of the dispensing to the coin discharge section 422 of the coin change machine 42 (Act S4). By executing the irradiation of the LED 47 in response to the timing of dispensing of the coin change machine 42 in this manner, it is possible to prevent the customer from forgetting to take away the coin discharged to the coin discharge section 422.

The controller 7 (notification module 92) of the settlement terminal 1 notifies a message indicating the detection of the object (Act S6) if an object (purse, coin, etc.) placed on the coin placing surface 71 or in the vicinity of the coin placing surface 71 is detected (Yes in Act S5) at the end of the payment by the customer (an example of the state where the deposit processing is ended). That message is a message indicating that an object is forgotten to be took away. The notification method includes a voice, a screen display, an output of a signal to an attendant terminal (not shown) and the like. Thus, that customer leaves the purse, the coin and the like on the coin placing surface 71 or in the vicinity of the coin placing surface 71. The controller 7 (notification module 92) of the settlement terminal 1 proceeds to the processing in Act S7 as it is if the object (purse, coin, etc.) is not detected (No in Act S5). The state where the deposit processing is finished is not limited to the stage at the end of the payment by the customer but also at the stage where the settlement processing is finished or the state where a human sensor does not detect a person after the payment by the customer is finished.

The controller 7 of the settlement terminal 1 terminates one transaction with completion of the settlement (Yes in Act S7) and shifts to a state (Act S1) of waiting for the start of a next transaction.

In this way, according to the settlement apparatus 1 of the present embodiment, the customer places the coin on the coin placing surface 71 of the coin placing section 70 and then slides the requested coin on the coin placing surface 71 to insert the coin into the coin insertion section 421. Therefore, the customer does not need to pick up the requested coins from the coins placed side by side for confirmation on the coin placing surface 71 and insert them into the coin insertion section 421, and it is possible to easily perform the operation of inserting the coins on the coin placing surface 71 into the coin insertion section 421 of the coin change machine 42.

In the embodiment, both the distance between the coin placing section 70 and the side end 11h of the first housing 11 closest to the coin placing section 70 and the distance between the coin insertion section 421 and the other side end 11g of the first housing 11 closest to the coin insertion section 421 are smaller than the length E of the depth of the coin placing section 70. Therefore, it is possible to secure a wide area of the coin placing section 70 in the flat surface section 11b of the settlement terminal 1.

While an embodiment of the present invention has been described, the embodiment has been presented byway of example only, and is not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, although the coin placing surface 71 is described as the flat surface in the embodiment, it is not limited thereto. For example, the coin placing surface 71 may be a concavo-convex surface that repeats unevenness in a direction orthogonal to the sliding direction of the coin. In this case, since the contact surface between the coin and the coin placing surface 71 is reduced, the coin slides easily on the coin placing surface 71.

In the embodiment, an example of applying the settlement terminal 1 which is the self-checkout apparatus 100 for the customer to execute the commodity registration and the settlement by himself/herself is described; however, the present invention is not limited to that. For example, as the cash processing apparatus, a checkout apparatus installed in a semi-self-check-out lane and used for the settlement processing by the customer after the commodity registration by the store clerk may be applied.

In the embodiment, as the cash processing apparatus, a ticket vending machine (ticket issuing machine) for issuing a ticket of a restaurant, a checkout machine in a parking lot or a station, a vending machine or the like can also be applied.

In the embodiment, an example in which the coin change machine 42 is applied as a cash depositing device and the cash depositing and dispensing device is described. However, the present invention is not limited to this, and the bill change machine 41 may be applied as the cash depositing device and the cash depositing and dispensing device.

In the embodiment, as shown in FIG. 4, the coin placing section 70 is connected to the left side of the coin insertion section 421, but it is not limited to this. For example, if the coin insertion section 421 is arranged on the left side, the coin placing section 70 may be connected to the right side of the coin insertion section 421.

What is claimed is:

1. A cash processing apparatus used in a settlement processing by a customer, comprising:
a housing provided with a depositing and dispensing section configured to store a coin and dispense the stored coin;
a display section configured to display a payment amount to a customer;
a coin insertion section arranged at a position at one side of a central part in a width direction of the housing and into which the coin is inserted;
a coin placing section, which is arranged in the housing and having a coin placing surface for temporarily placing the coin, configured to connect to the coin insertion section side by side and extend to an opposite side across the central part in the width direction of the housing from the coin insertion section to form a shape elongated in the width direction; and
a settlement module configured to receive the coin inserted into the coin insertion section to execute a processing, wherein
both a distance between the coin insertion section and one side end of the housing which is closest to the coin insertion section and a distance between the coin placing section and the other side end of the housing which is closest to the coin placing section are smaller than a length of the coin placing section in a depth direction of the housing.

2. The cash processing apparatus according to claim 1, further comprising:
a printer configured to issue a receipt on which a content is printed based on a processing by the settlement module.

3. The cash processing apparatus according to claim 1, wherein
a distance combining a length of the coin insertion section in the width direction of the housing and a length of the coin placing section in the width direction of the housing is 70% or more of a length in the width direction of the housing.

4. The cash processing apparatus according to claim 2, wherein
a distance combining a length of the coin insertion section in the width direction of the housing and a length of the coin placing section in the width direction of the housing is 70% or more of a length in the width direction of the housing.

5. The cash processing apparatus according to claim 1, wherein
the coin insertion section is formed with a color different from the housing and the coin placing section.

6. The cash processing apparatus according to claim 1, wherein
the coin placing surface is formed with a color that is visibly distinct from coins that are temporarily placed on the coin placing surface.

7. The cash processing apparatus according to claim 1, wherein
the coin placing surface has a display for indicating a placing area of the coin.

8. The cash processing apparatus according to claim 1, further comprising:
a detection section configured to detect an object placed on the coin placing surface; and
a notification module configured to provide a message indicating that there is an object on the coin placing surface in a case in which the detection section detects the object placed on the coin placing surface in a state in which the deposit processing is terminated.

9. The cash processing apparatus according to claim 1, wherein
the coin placing section has a planar bottom surface parallel to a floor surface.

10. The cash processing apparatus according to claim 1, wherein
the coin insertion section and the coin placing section have an inclined surface that descends from outside toward inside.

11. A self-checkout register, comprising:
a bill change machine;
a housing provided with a depositing and dispensing section configured to store a coin and dispense the stored coin;
a display section configured to display a payment amount to a customer;
a coin insertion section arranged at a position at one side of a central part in a width direction of the housing and into which the coin is inserted;
a coin placing section, which is arranged in the housing and having a coin placing surface for temporarily placing the coin, configured to connect to the coin insertion section side by side and extend to an opposite side across the central part in the width direction of the housing from the coin insertion section to form a shape elongated in the width direction; and
a settlement module configured to receive the coin inserted into the coin insertion section to execute a processing, wherein
both a distance between the coin insertion section and one side end of the housing which is closest to the coin insertion section and a distance between the coin placing section and the other side end of the housing which is closest to the coin placing section are smaller than a length of the coin placing section in a depth direction of the housing.

12. The self-checkout register according to claim 11, further comprising:
a printer configured to issue a receipt on which a content is printed based on a processing by the settlement module.

13. The self-checkout register according to claim 11, wherein
a distance combining a length of the coin insertion section in the width direction of the housing and a length of the coin placing section in the width direction of the housing is 70% or more of a length in the width direction of the housing.

14. The self-checkout register according to claim 12, wherein
a distance combining a length of the coin insertion section in the width direction of the housing and a length of the coin placing section in the width direction of the housing is 70% or more of a length in the width direction of the housing.

15. The self-checkout register according to claim 11, wherein the coin insertion section is formed with a color different from the housing and the coin placing section.

16. The self-checkout register according to claim 11, wherein
the coin placing surface is formed with a color that is visibly distinct from coins that are temporarily placed on the coin placing surface.

17. The self-checkout register according to claim 11, wherein
the coin placing surface has a display for indicating a placing area of the coin.

18. The self-checkout register according to claim 11, further comprising:
a detection section configured to detect an object placed on the coin placing surface; and
a notification module configured to provide a message indicating that there is an object on the coin placing surface in a case in which the detection section detects the object placed on the coin placing surface in a state in which the deposit processing is terminated.

19. The self-checkout register according to claim 11, wherein
the coin placing section has a planar bottom surface parallel to a floor surface.

20. The self-checkout register according to claim 11, wherein
the coin insertion section and the coin placing section have an inclined surface that descends from outside toward inside.

* * * * *